United States Patent [19]

Han et al.

[11] Patent Number: 5,352,742
[45] Date of Patent: Oct. 4, 1994

[54] HYDROXYFLUOROALKYL-SUBSTITUTED STYRENES AND POLYMERIC COMPOSITIONS CONTAINING SAME

[75] Inventors: Charles C. Han, Gaithersburg, Md.; Manjun He, Shanghai, China; Yongming Liu, Shanghai, China; Yi Feng, Shanghai, China; Ming Jiang, Shanghai, China

[73] Assignee: The United States of America as represented by the Secretary of Commerce, Washington, D.C.

[21] Appl. No.: 162,356

[22] Filed: Dec. 7, 1993

Related U.S. Application Data

[62] Division of Ser. No. 985,932, Dec. 4, 1992, Pat. No. 5,272,232, which is a division of Ser. No. 822,280, Jan. 21, 1992, Pat. No. 5,241,007.

[51] Int. Cl.$^5$ .................................. C08F 259/08
[52] U.S. Cl. .................................. 525/276; 525/426; 525/445
[58] Field of Search .................. 525/276, 426, 445

[56] References Cited

U.S. PATENT DOCUMENTS

| | | | |
|---|---|---|---|
| 3,179,640 | 4/1965 | Middleton | 260/85.5 |
| 4,640,965 | 2/1987 | Falcetta et al. | 526/242 |
| 4,690,993 | 9/1987 | Falcetta et al. | 526/242 |

OTHER PUBLICATIONS

Journal of Macromolecular Science–Chemistry, A21, pp. 1181–1216 (1954), Pearce, et al "Polymer Compatibilization through hydrogen bonding".
Macromolecules, vol. 24, No. 2, 464–473, 1991, Han et al, "Spinodal decomposition in a hydrogen–bonded polymer blend."
CA 114(22):208303f—Ming et al. Makromol. Chem. Macromol. Symp., 38 (Invited Lect. Microsymp. Makromol. Polym. Blends 32nd., 1989) 161–72–1990.

Primary Examiner—Joseph L. Schofer
Assistant Examiner—N. Sarofim
Attorney, Agent, or Firm—Thomas P. Pavelko

[57] ABSTRACT

Fluorinated styrenes of the formula I:

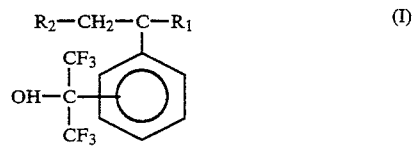

where $R_1$ is a $C_1$–$C_6$ alkyl and $R_2$ is the repeating unit

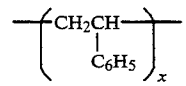

where x is zero or any positive integer, which are useful as compatibilizing and toughening agents for various polymers such as styrene, dienes (butadiene, isoprene, etc.) acrylates, polymethacrylates, polycarbonates, polyesters, polyamides, etc. Particularly preferred are p-(1,1,1,3,3,3-hexafluoro-2-hydroxy isopropyl)-α-methylstyrene, polymers thereof, block and random copolymers thereof and polymer blends incorporating the same.

4 Claims, 2 Drawing Sheets

HYDROXYFLUOROALKYL-SUBSTITUTED STYRENES AND POLYMERIC COMPOSITIONS CONTAINING SAME

This is a division of application Ser. No. 07/985,932, filed Dec. 4, 1992, now U.S. Pat. No. 5,272,232; which in turn is a division of application Ser. No. 07/822,280, filed Jan. 21, 1992, now U.S. Pat. No. 5,241,007.

BACKGROUND OF THE INVENTION

1. Field of the Invention

This invention relates to novel hydroxy fluoroalkyl-substituted styrenes and polymeric compositions containing them.

2. Description of the Prior Art

Hydroxy fluoroalkyl-substituted styrenes of the prior art have been reported in the literature, See Pearce et al., "Polymer Compatibilization Through Hydrogen Bonding", *Journal of Macromolecular Science - Chemistry*, A21, pp. 1181–1216 (1954), as laving an effect on the miscibility thereof wit, other polymers through the phenomena known as "hydrogen bonding". Pearce et al. disclosed the synthesis of p-(hexafluoro-2-hydroxyl isopropyl) styrene as a copolymer with styrene by radical polymerization in solution. Synthesis of the monomer p-(hexafluoro-2-hydroxyl isopropyl) styrene is also disclosed by Pearce et al. as well as in U.S. Pat. No. 3,179,640, the entire disclosures of both of which are herein incorporated by reference.

Pearce et al. proposed polymer blends by solution blending in common solvents, such as toluene for various styrene copolymers with PVME, PVAC, PMMA, PEMA, PBMA, PPO, PC, VTL(I), and VTL(II); methylene chloride for blends with PSAN and PDMS; chloroform for blends with PVMK and PPSE; and m-cresol for blends with KOD and TRO. Films were prepared by casting blend solutions onto glass or polytetrafluoroethylene plates at ambient temperature, except for m-cresol solutions which were cast onto a glass plate placed in a vacuum oven at 110° C. for rapid evaporation of m-cresol without thermal decomposition of the samples.

The resulting films were used for thermal analysis and cloud point measurement. It is reported that solvent-free films laving uniform thickness were prepared with special care for infrared spectroscopy studies.

Pearce et al. concluded that although the experimental data substantiated the notion of miscibility enhancement through specific interaction important questions were left unanswered and deficiencies were noted. For example, in the mixtures of Pearce et al. long sequences of polystyrene (PS) segments, approximately 50 on the average between hydrogen bonds, were formed. Such long sequences of PS segments are inherently immiscible with PBMA segments.

OBJECTS OF THE INVENTION

It is an object of the invention to provide new and useful hydroxyfluoroalkyl-substituted styrene and polymer blends containing them which avoids the problems of the prior art.

It is a further object to provide new monomers in polymer blends containing them for compatibilization, toughening or other functional purpose in polymer blending or alloying processes.

It is a further object to provide new monomers which are effective in compatibilizing polymers even though the content of the monomers can be very low (on the order of about 1 mol %).

It is a still further object to provide new monomers which can be used as toughening components or serve special functional applications such as refractive index matching and birefringence-reducing applications.

These and other objects of the invention can be achieved as will be apparent from the following description of the invention.

SUMMARY OF THE INVENTION

New hydrogen fluoroalkyl-substituted styrenes of the formula I:

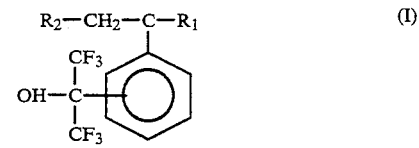

where $R_1$ is a $C_1$–$C_6$ alkyl and $R_2$ is the repeating unit of styrene

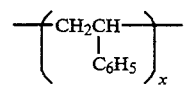

where x is zero or any positive integer. These monomers can be readily copolymerized with styrene. Particularly preferred compositions include modified polystyrene which contains 1.5 mol % of p-(1,1,1,3,3,3-hexafluoro-2-hydroxyisopropyl)-α-methylstyrene (HFHIMS) as copolymer. Such modified styrenes will be abbreviated as PS(OH) hereinafter for simplicity of formula II:

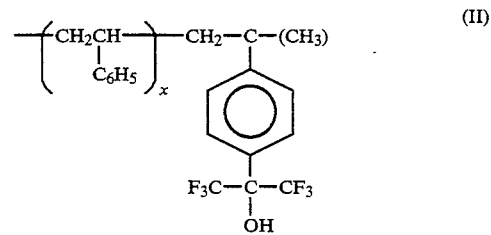

wherein x is any positive integer. The HFHIMS monomer can also be randomly co-polymerized with many useful monomers such as dienes (butadiene, isoprene, etc.) styrene, acrylates, methacrylates, etc. Since the hydrogen bonding is very effective in compatibilizing monomers, the HFHIMS content can be very low (about 1 mol %).

Since HFHIMS can hydrogen bond with any carbonyl group from any carbonyl-group containing polymer, a block copolymer of any polymer A (A block or blocks of polymer A) with B block (or blocks) of polymer B which contains HFHIMS is also provided as a general compatibilizer for polymer A with many other carbonyl-group-containing polymers.

An HFHIMS-containing block copolymer can itself be used as a toughening component (if the other block is rubbery) or serve for special functional applications, such as refractive index matching or birefringence-reducing applications.

DETAILED DESCRIPTION OF THE INVENTION

Figure 1A:
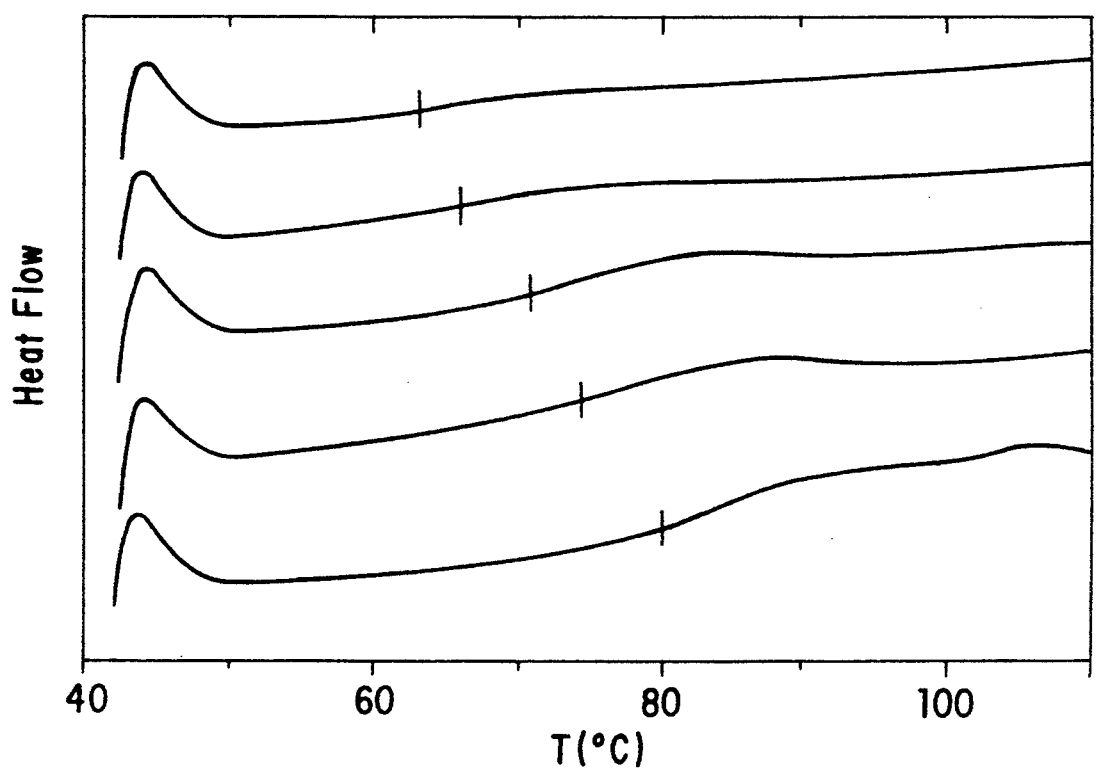
FIG. 1a is a graph of differential scanning calorimetry runs for PS(OH) and PS(OH)/PBMA blends with varying PBMA contents.

Compatibiltzation and morphology stabilization are two of the more important problems in the polymer blends industry. In order to tailor the properties of polymer blends/alloys, miscibility or partial miscibility between polymer pairs is necessary. Unfortunately, most polymer pairs are immiscible. Generally it is difficult to make immiscible pairs become miscible without drastically changing the chemical structure (and hence the properties) of at least one of the polymers. The other possibility is to use block copolymers to modify the interfacial tension and stabilize a phase-separated (or microphase-separated) morphology, formed from a blend of polymer A and polymer B. In such a case, one of the components of the block copolymer should either be A, or miscible wit, A, and the other component should be B, or miscible with B.

As discussed above, Pearce et al. attempted to achieve miscibllity of p-(hexafluoro-2-hydroxyl-propyl) containing styrene,

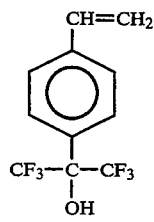

(III)

with other polymers. The successfulness of their work is questionable as indicated in their paper. This is because in modifying polystyrene with this monomer, long polystyrene sequences were formed between hydrogen bonds.

The present applicants lave discovered that lower alkyl modified hexafluoro-2-hydroxyl-propyl styrene, such as an α-methyl modified styrene provide strong hydrogen bonding for compatibilization, toughening or other functional purpose in polymer blending or alloying processes while at the same time randomizing the location of the hydrogen bonding sites. Thus, the problems reported by Pearce et al. are avoided.

Particularly preferred is p-(1,1,1,3,3,3-hexafluoro-2-hydroxy isopropyl)-α-methylstyrene (HFHIMS) which can be readily copolymerized using free radical processes with other monomers, such as dienes, styrenes, acrylates, methacrylates, etc. The resulting copolymers show increased miscibility with other carbonyl-containing polymers due to the hydrogen bonding between the hydroxy group of the HFHIMS monomer and the carbonyl group from the other polymers. Block or graft copolymers containing HFHIMS as one of the blocks can also be used as a compatibilizer (or interfacial modifier) in blending and polymer alloying processes.

The HFHIMS monomer is the most effective compatibilizer due to the bulky hexafluoro hydroxy isopropyl group which inhibits self hydrogen bonding with each other while the α-methyl group promotes random distribution of HFHIMS monomers in radical copolymerization with styrene at room temperature.

HFHIMS and any of the other hydroxy containing α-alkyl styrene based monomers of the invention can be randomly copolymerized with dienes (butadiene, isoprene, etc.) and thus the resulting copolymer can be used as toughening components for any carbonyl containing polymers, such as polyacrylates, polymethacrylates, polycarbonates, polyesters, polyamides, etc.

HFHIMS and any of the other hydroxy containing α-alkyl styrene based monomers of the invention can be made into block copolymers and graft copolymers with dienes, styrenes, acrylates and methacrylates, etc. and then the block or graft copolymer can be used as a general compatibilizer for blending and polymer alloying processes.

HFHIMS and any of the other hydroxy containing α-alkyl styrene based monomers can be copolymerized with a functional carrying monomer, and the resulting copolymer can be disposed into another polymer for special purpose, such as refractive index matching, birefringence reducing, etc.

The novel monomers and copolymer blends of this invention can be made by synthesis procedures which are similar to that disclosed by Pearce et al. and in U.S. Pat. No. 3,179,640, the entire disclosures of both of which are herein incorporated by reference.

For example, the synthesis of p-(1,1,1,3,3,3-hexafluoro-2-hydroxyisopropyl)-α-methylstyrene can be obtained by the scheme

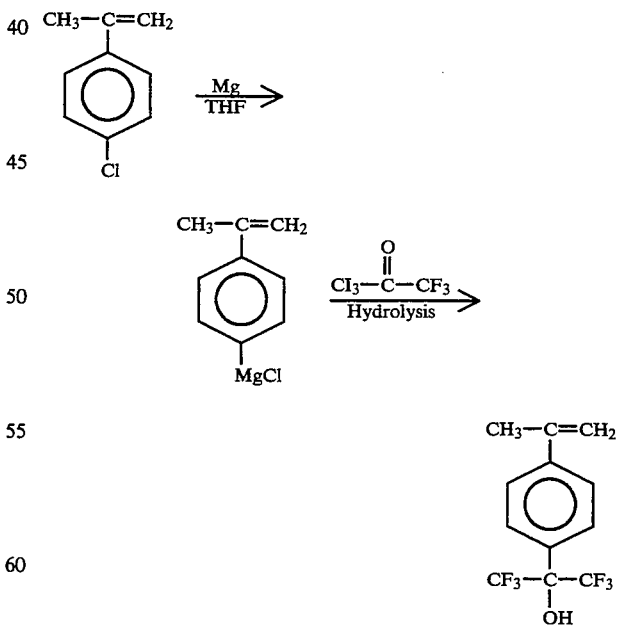

HFHIMS and the other α-alkyl modified styrenes are preferred to other hydroxyfluoroalkyl-substituted styrenes because of this ability to simultaneously minimize the possibility of self-bonding between the HFHIMS groups from the same or different polystyrene chains, therefore, only a small molar percent (about 1 mol %) is enough to change the phase behavior completely while at the same time randomizing the location of the bonding sites. Alpha-methylstyrenes are particularly preferred because of their low-ceiling temperature in order to eliminate HFHIMS sequences for a more random distribution.

Radically polymerized HFHIMS group-containing modified polystyrenes PS(OH) are purified in $CH_2Cl_2$/petroleum ether. Molecular weight of $3.7 \times 10^4$ and molecular weight distribution of $M_w/M_n = 1.7$ was measured by GPC. The comonomer HFHIMS concentration is determined by the monomer ratio of the feed for copolymerization. The second component of the blend poly(butyl methacrylate) (PBMA) is also radically polymerized and then fractionated in $CH_2Cl_2/CH_3OH$ with $M_w = 4.2 \times 10^4$ and $M_w/M_n = 1.5$.

Specimens of HFHIMS modified polystyrenes/PBMA at different compositions were prepared by casting from benzene solutions (about 10% total polymer concentration) of desired polymer composition on quartz window plates for temperature-jump light-scattering measurements. All specimens were dried in a vacuum oven at 70° C. for at least 7 days before measurements.

Differential scanning calorimetry (DCS) runs were carried out on a Perkin-Elmer instrument at a heating rate of 10° C./min. The temperature-Jump light-scattering (TJLS) measurements were carried out on a time-resolved static light-scattering instrument, which uses a 5-mW He-Ne laser as the light source and a set of lenses for scattering light collection, collimation and angular mapping onto a linear photodiode array detector (Radicon tube). An optical multichannel analyzer (OMA3) is used for data acquisition. Collimation and scattering sample size desmearing is carried out in the optical field by the lens system.

Two sets of heating blocks were used for the temperature-jump experiments: One was used to preheat the sample to a temperature below the binodal temperature in the miscible region while the other was controlled at a desired experimental temperature. Temperatures are controlled by PID controllers to within 0.02° C. of specified temperatures. It takes about 1 min to reach temperature equilibrium after transfer of the sample cell from one heating block to the other for a temperature-jump; therefore, the initial time of the experiment is chosen to be at the end of 1 min after transferring the sample. The sensitivity of the radicon detector was calibrated by fluorescence radiation from Nile Blue dye ($5 \times 10^{-6}$ g/mL) embedded in gelatin gel in a flat cell of 100-$\mu$m thickness.

Figure 1B:
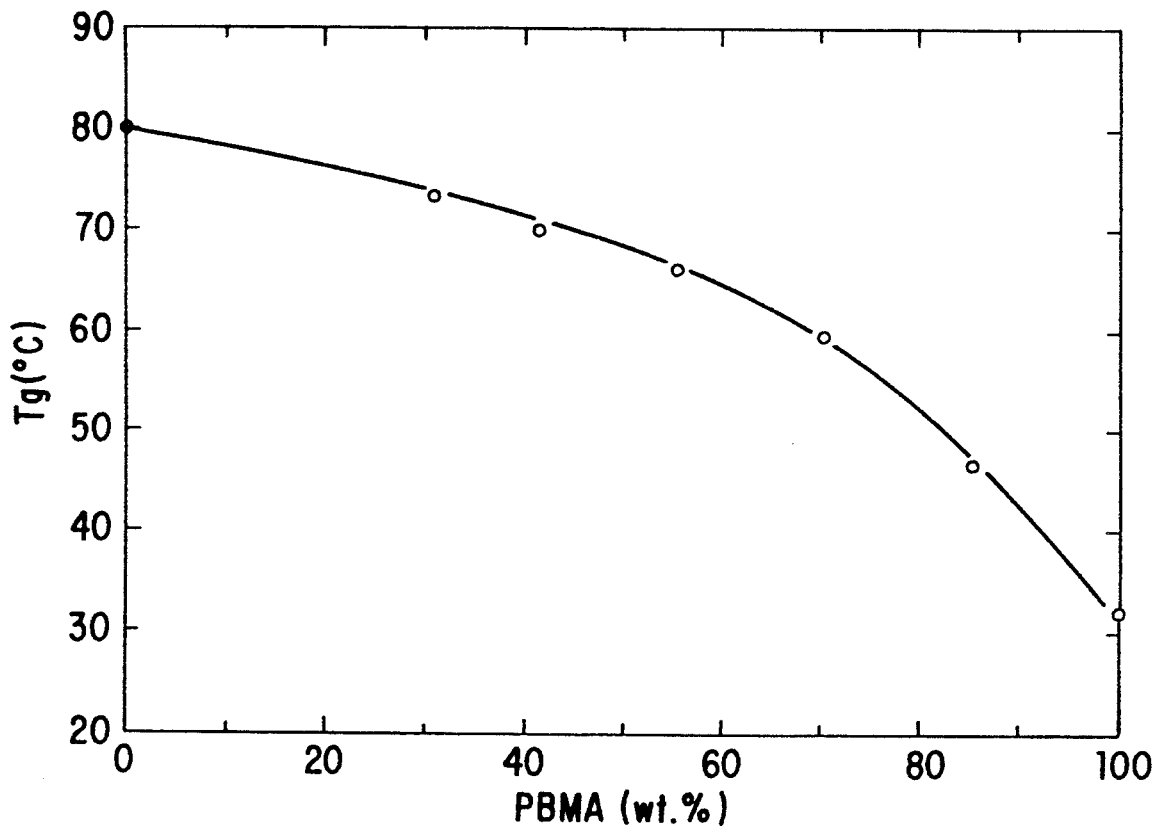
FIG. 1b is a graph of glass transition temperatures obtained from the PIPS of FIG. 1a together with two additional ones at 85.0 wt % and pure PBMA.

The HFHIMS modified polystyrene/PBMA blends cast from benzene solution exhibit a pronounced single glass transition temperature in all compositions. The DSC runs for PS(OH) and Ps(OH)/PBMA blends thereof at 30.9, 41.5, 55.4 and 70.4 wt % PBMA, respectively from the bottom, are shown in FIG. 1a. The glass transition temperatures are obtained from the midpoint as indicated by the pips in FIG. 1a and are plotted in FIG. 1b together with two additional ones at 85.0 wt % and pure PBMA. the solid curve is arbitrarily drawn to follow the points. This DSC study clearly demonstrated that all solution-cast samples are miscible.

The temperature-jump-light scattering technique is used to study the spinodal decomposition of these HFHIMS modified polystyrene/PBMA blends and is reported in our publication in *Macromolecules*, vol. 24, no. 2, 464–473, 1991, the entire disclosure of which is herein incorporated by reference.

Although it is difficult to measure the cloud-point temperatures correctly, because of the slow growth rate, R(q), we have found that we can obtain cloud-point temperatures successfully with the following procedure:

(i) First take the blend into the unstable region for a relatively short time (about 1 hour), wait until the structure factor S(q) starts to grow; and (ii) quench the specimen back to a lower temperature, $T_1$.

Figure 2A:
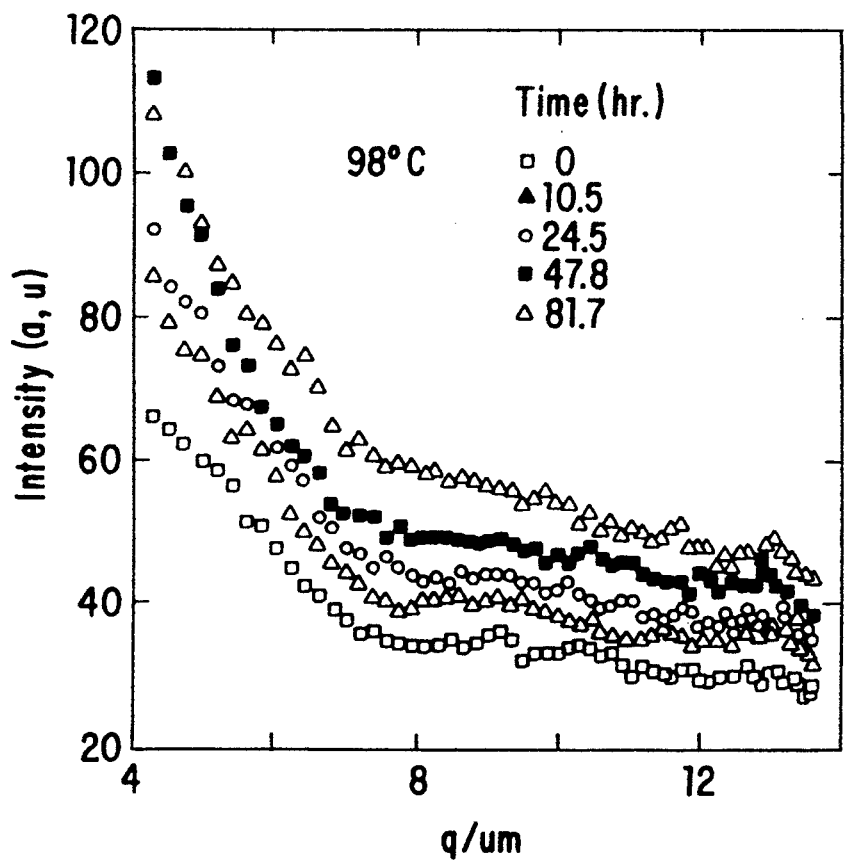
FIG. 2a is a graph of scattering intensity for a 70.4 wt % PBMA blend Jumped form 95° C. to 109° C. and quenched to 98° C. which is the metastable region.
Figure 2B:
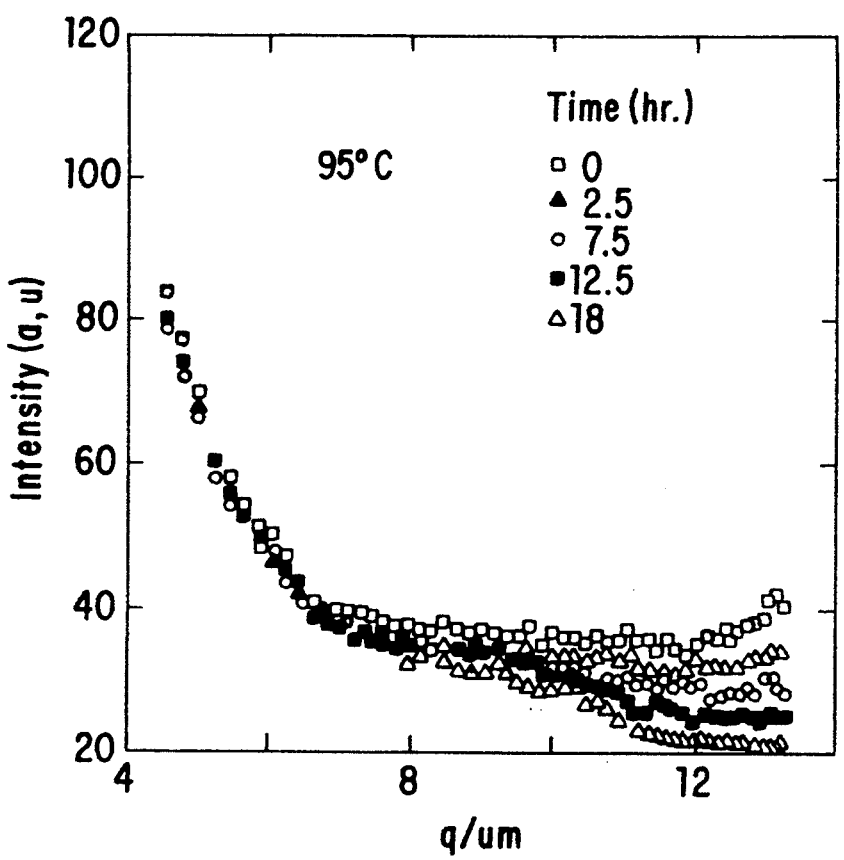
FIG. 2b is a graph for a sample the same as in FIG. 2a but quenched back to 95° C., which is the miscible region.

The structure generated will start to melt away if the temperature, $T_1$, is in the miscible region, but it will continue to grow if $T_1$ is still in the metastable region or in the unstable region. For example, in FIG. 2a, a 70.4 wt % PBMA blend has been Jumped from 95° C. to 109° C. (inside the unstable region, $T_s = 105°$ C.) for approximately one hour and quenched back to 98° C. The scattering intensity, S(q), is displayed as a fraction of q for different times after quench back to 98° C. It can be seen that S(q) is still growing at all q's. This indicates that the blend is in the metastable region without a characteristic growth maximum for spinodal growth. However, if the same procedure is repeated but quenched back to a lower temperature, such as 95° C., then the structure will show characteristic melting as illustrated in FIG. 2b. When this somewhat tedious procedure is repeated, cloud-point temperatures can be obtained, which are listed in Table I together with spinodal temperatures.

TABLE 1

| Measured Spinodal ($T_s$) and Cloud T($_c$) | | |
|---|---|---|
| composition (PBMA wt %) | $T_s$ | $T_c$ |
| 41.5 | 134.5 | 134.5 |
| 55.4 | 118.8 | |
| 70.4 | 105 | 96 |
| 85.0 | 95 | 87 |
| 95.0 | 103.4 | 99 |

The comonomers of the present invention have been demonstrated to be very effective in introducing miscibility into polymer blend systems into which they are incorporated as well as to randomize the distribution of the comonomer through the system even at relatively low concentrations (about 1 mol %). It is readily apparent that the invention may be modified through the exercise of the ordinary skill of the worker in the art without departing from the scope of the appended claims.

We claim:

1. A block copolymer of a fluorinated styrene of the formula

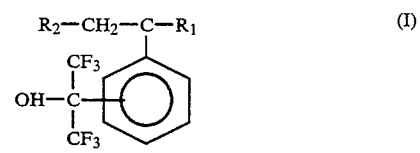

wherein $R_1$ is a $C_1$–$C_6$ alkyl and $R_2$ is the repeating styrene unit

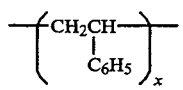

wherein x is zero or any positive integer
with polystyrene blocks.

2. A block copolymer of a fluorinated styrene of the formula

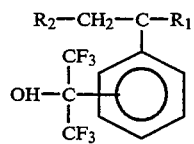

wherein $R_1$ is a $C_1$-$C_6$ alkyl and $R_2$ is the repeating styrene unit

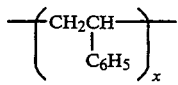

wherein x is zero or any positive integer
with at least a carbonyl-group containing polymer block.

3. A block copolymer of a fluorinated styrene of the formula

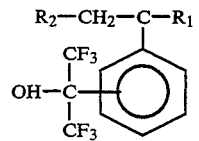

wherein $R_1$ is a $C_1$-$C_6$ alkyl and $R_2$ is the repeating styrene unit

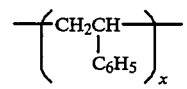

wherein x is zero or any positive integer
with at least one diene containing polymer block.

4. The block copolymer of a fluorinated styrene according to claim 2, wherein the carbonyl-group containing polymer is selected from the group consisting of polyacrylates, polymethacrylates, polycarbonates, polyesters and polyamides.

* * * * *